US008611222B1

(12) United States Patent
Mukerji et al.

(10) Patent No.: US 8,611,222 B1
(45) Date of Patent: *Dec. 17, 2013

(54) SELECTIVELY ENABLING PACKET CONCATENATION BASED ON A TRANSACTION BOUNDARY

(75) Inventors: Arindum Mukerji, Seattle, WA (US); Jesse Abraham Rothstein, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,187

(22) Filed: Aug. 22, 2012

Related U.S. Application Data

(63) Continuation of application No. 11/366,367, filed on Mar. 2, 2006.

(60) Provisional application No. 60/764,005, filed on Feb. 1, 2006.

(51) Int. Cl.
  *H04L 12/28* (2006.01)
(52) U.S. Cl.
  USPC .......................................... 370/235
(58) Field of Classification Search
  None
  See application file for complete search history.

(56) References Cited

U.S. PATENT DOCUMENTS

| | | | |
|---|---|---|---|
| 3,689,872 A | 9/1972 | Sieracki | |
| 3,768,726 A | 10/1973 | Hale et al. | |
| 4,021,782 A | 5/1977 | Hoerning | |
| 4,054,951 A | 10/1977 | Jackson et al. | |
| 4,316,222 A | 2/1982 | Subramaniam | |
| 4,386,416 A | 5/1983 | Giltner et al. | |
| 4,593,324 A | 6/1986 | Ohkubo et al. | |
| 4,626,829 A | 12/1986 | Hauck | |
| 4,701,745 A | 10/1987 | Waterworth | |
| 4,862,167 A | 8/1989 | Copeland, III | |
| 4,876,541 A | 10/1989 | Storer | |
| 4,890,282 A | 12/1989 | Lambert et al. | |
| 4,897,717 A | 1/1990 | Hamilton et al. | |
| 4,906,991 A | 3/1990 | Fiala et al. | |
| 4,971,407 A | 11/1990 | Hoffman | |
| 4,988,998 A | 1/1991 | O'Brien | |
| 5,003,307 A | 3/1991 | Whiting et al. | |
| 5,016,009 A | 5/1991 | Whiting et al. | |

(Continued)

OTHER PUBLICATIONS

Official Communication for U.S. Appl. No. 11/243,844 mailed Nov. 26, 2012.

(Continued)

*Primary Examiner* — Otis L Thompson, Jr.
*Assistant Examiner* — Amar Persaud
(74) *Attorney, Agent, or Firm* — Frommer Lawrence & Haug LLP; Jamie L. Wiegand

(57) ABSTRACT

A system, apparatus, and method are directed towards selectively combining data into a packet to modify a number of packets transmitted over a network based on a detection of a transaction boundary. If it is determined to concatenate the data, such concatenation may continue until an acknowledgement (ACK) is received, or a predetermined amount of data is concatenated in the packet, or a transaction boundary is detected. If at least one of these conditions is satisfied, concatenation may be inhibited, and the packet may be sent. Concatenation is then re-enabled. In one embodiment, Nagle's algorithm is used for concatenating data into a packet. In one embodiment, an ACK may be sent based on a write completion indicator included within a packet. Receipt of the ACK may disable concatenation.

20 Claims, 6 Drawing Sheets

(56) References Cited

U.S. PATENT DOCUMENTS

| | | |
|---|---|---|
| 5,109,433 A | 4/1992 | Notenboom |
| 5,126,739 A | 6/1992 | Whiting et al. |
| 5,146,221 A | 9/1992 | Whiting et al. |
| 5,150,430 A | 9/1992 | Chu |
| 5,155,484 A | 10/1992 | Chambers, IV |
| 5,167,034 A | 11/1992 | MacLean, Jr. et al. |
| 5,212,742 A | 5/1993 | Normile et al. |
| 5,249,053 A | 9/1993 | Jain |
| 5,280,600 A | 1/1994 | Van Maren et al. |
| 5,293,388 A | 3/1994 | Monroe et al. |
| 5,319,638 A | 6/1994 | Lin |
| 5,341,440 A | 8/1994 | Earl et al. |
| 5,367,629 A | 11/1994 | Chu et al. |
| 5,379,036 A | 1/1995 | Storer |
| 5,410,671 A | 4/1995 | Elgamal et al. |
| 5,414,425 A | 5/1995 | Whiting et al. |
| 5,463,390 A | 10/1995 | Whiting et al. |
| 5,479,587 A | 12/1995 | Campbell et al. |
| 5,488,364 A | 1/1996 | Cole |
| 5,504,842 A | 4/1996 | Gentile |
| 5,506,944 A | 4/1996 | Gentile |
| 5,539,865 A | 7/1996 | Gentile |
| 5,542,031 A | 7/1996 | Douglass et al. |
| 5,544,290 A | 8/1996 | Gentile |
| 5,546,395 A | 8/1996 | Sharma et al. |
| 5,546,475 A | 8/1996 | Bolle et al. |
| 5,553,160 A | 9/1996 | Dawson |
| 5,553,242 A | 9/1996 | Russell et al. |
| 5,610,905 A | 3/1997 | Murthy et al. |
| 5,615,287 A | 3/1997 | Fu et al. |
| 5,638,498 A | 6/1997 | Tyler et al. |
| 5,768,445 A | 6/1998 | Troeller et al. |
| 5,768,525 A | 6/1998 | Kralowetz et al. |
| 5,774,715 A | 6/1998 | Madany et al. |
| 5,805,932 A | 9/1998 | Kawashima et al. |
| 5,825,890 A | 10/1998 | Elgamal et al. |
| 5,850,565 A | 12/1998 | Wightman |
| 5,874,907 A | 2/1999 | Craft |
| 5,884,269 A | 3/1999 | Cellier et al. |
| 5,892,847 A | 4/1999 | Johnson |
| 5,898,837 A | 4/1999 | Guttman et al. |
| 5,941,988 A | 8/1999 | Bhagwat et al. |
| 5,951,623 A | 9/1999 | Reynar et al. |
| 5,991,515 A | 11/1999 | Fall et al. |
| 6,023,722 A | 2/2000 | Colyer |
| 6,052,785 A | 4/2000 | Lin et al. |
| 6,061,454 A | 5/2000 | Malik et al. |
| 6,070,179 A | 5/2000 | Craft |
| 6,182,139 B1 | 1/2001 | Brendel |
| 6,223,287 B1 | 4/2001 | Douglas et al. |
| 6,226,687 B1 | 5/2001 | Harriman et al. |
| 6,253,226 B1 | 6/2001 | Chidambaran et al. |
| 6,298,380 B1 | 10/2001 | Coile et al. |
| 6,367,009 B1 | 4/2002 | Davis et al. |
| 6,370,584 B1 | 4/2002 | Bestavros et al. |
| 6,411,986 B1 | 6/2002 | Susai et al. |
| 6,434,618 B1 | 8/2002 | Cohen et al. |
| 6,584,567 B1 | 6/2003 | Bellwood et al. |
| 6,590,588 B2 | 7/2003 | Lincke et al. |
| 6,625,150 B1 | 9/2003 | Yu |
| 6,629,163 B1 | 9/2003 | Balassanian |
| 6,633,835 B1 | 10/2003 | Moran et al. |
| 6,643,259 B1 | 11/2003 | Borella et al. |
| 6,643,701 B1 | 11/2003 | Aziz et al. |
| 6,650,640 B1 | 11/2003 | Muller et al. |
| 6,654,701 B2 | 11/2003 | Hatley |
| 6,665,725 B1 | 12/2003 | Dietz et al. |
| 6,668,327 B1 | 12/2003 | Prabandham et al. |
| 6,674,717 B1 | 1/2004 | Duong-van et al. |
| 6,681,327 B1 | 1/2004 | Jardin |
| 6,697,363 B1 | 2/2004 | Carr |
| 6,718,388 B1 | 4/2004 | Yarborough et al. |
| 6,754,662 B1 | 6/2004 | Li |
| 6,754,831 B2 | 6/2004 | Brownell |
| 6,760,782 B1 | 7/2004 | Swales |
| 6,763,384 B1 | 7/2004 | Gupta et al. |
| 6,766,373 B1 | 7/2004 | Beadle et al. |
| 6,768,716 B1 | 7/2004 | Abel et al. |
| 6,768,726 B2 | 7/2004 | Dorenbosch et al. |
| 6,789,203 B1 | 9/2004 | Belissent |
| 6,792,461 B1 | 9/2004 | Hericourt |
| 6,799,276 B1 | 9/2004 | Belissent |
| 6,829,238 B2 | 12/2004 | Tokuyo et al. |
| 6,831,923 B1 | 12/2004 | Laor et al. |
| 6,842,462 B1 | 1/2005 | Ramjee et al. |
| 6,854,117 B1 | 2/2005 | Roberts |
| 6,895,443 B2 | 5/2005 | Aiken |
| 6,928,082 B2 | 8/2005 | Liu et al. |
| 6,934,260 B1 | 8/2005 | Kanuri |
| 6,934,848 B1 | 8/2005 | King et al. |
| 6,950,434 B1 | 9/2005 | Viswanath et al. |
| 6,954,462 B1 | 10/2005 | Chu et al. |
| 6,954,780 B2 | 10/2005 | Susai et al. |
| 6,957,272 B2 | 10/2005 | Tallegas et al. |
| 6,990,592 B2 | 1/2006 | Richmond et al. |
| 7,013,342 B2 | 3/2006 | Riddle |
| 7,023,804 B1 | 4/2006 | Younes et al. |
| 7,047,315 B1 | 5/2006 | Srivastava |
| 7,051,330 B1 | 5/2006 | Kaler et al. |
| 7,069,438 B2 | 6/2006 | Balabine et al. |
| 7,103,045 B2 | 9/2006 | Lavigne et al. |
| 7,113,993 B1 | 9/2006 | Cappiello et al. |
| 7,139,792 B1 | 11/2006 | Mishra et al. |
| 7,139,811 B2 | 11/2006 | Lev Ran et al. |
| 7,177,311 B1 | 2/2007 | Hussain et al. |
| 7,181,493 B2 | 2/2007 | English et al. |
| 7,215,637 B1 | 5/2007 | Ferguson et al. |
| 7,231,445 B1 | 6/2007 | Aweya et al. |
| 7,231,657 B2 | 6/2007 | Honarvar et al. |
| 7,254,639 B1 | 8/2007 | Siegel et al. |
| 7,266,613 B1 | 9/2007 | Brown et al. |
| 7,280,471 B2 | 10/2007 | Rajagopal et al. |
| 7,287,077 B2 | 10/2007 | Haugh et al. |
| 7,313,627 B1 | 12/2007 | Noble |
| 7,315,513 B2 | 1/2008 | McCann et al. |
| 7,321,926 B1 | 1/2008 | Zhang et al. |
| 7,324,447 B1 | 1/2008 | Morford |
| 7,350,229 B1 | 3/2008 | Lander |
| 7,359,974 B1 | 4/2008 | Quinn et al. |
| 7,362,762 B2 | 4/2008 | Williams, Jr. et al. |
| 7,421,515 B2 | 9/2008 | Marovich |
| 7,463,637 B2 | 12/2008 | Bou-Diab et al. |
| 7,484,011 B1 | 1/2009 | Agasaveeran et al. |
| 7,496,750 B2 | 2/2009 | Kumar et al. |
| 7,571,313 B2 | 8/2009 | Messerges et al. |
| 7,586,851 B2 | 9/2009 | Panigrahy et al. |
| 7,596,137 B2 | 9/2009 | Bennett |
| 7,599,283 B1 | 10/2009 | Varier et al. |
| 7,619,983 B2 | 11/2009 | Panigrahy |
| 7,623,468 B2 | 11/2009 | Panigrahy et al. |
| 7,624,436 B2 | 11/2009 | Balakrishnan et al. |
| 7,711,857 B2 | 5/2010 | Balassanian |
| 7,721,084 B2 | 5/2010 | Salminen et al. |
| 8,009,566 B2 | 8/2011 | Zuk et al. |
| 2001/0032254 A1 | 10/2001 | Hawkins |
| 2001/0049741 A1 | 12/2001 | Skene et al. |
| 2002/0025036 A1 | 2/2002 | Sato |
| 2002/0054567 A1 | 5/2002 | Fan |
| 2002/0055980 A1 | 5/2002 | Goddard |
| 2002/0059428 A1 | 5/2002 | Susai et al. |
| 2002/0073223 A1 | 6/2002 | Darnell et al. |
| 2002/0085587 A1 | 7/2002 | Mascolo |
| 2002/0103663 A1 | 8/2002 | Bankier et al. |
| 2002/0107903 A1 | 8/2002 | Richter et al. |
| 2002/0126671 A1 | 9/2002 | Ellis et al. |
| 2002/0133586 A1 | 9/2002 | Shanklin et al. |
| 2002/0141393 A1 | 10/2002 | Eriksson et al. |
| 2002/0147916 A1 | 10/2002 | Strongin et al. |
| 2002/0169980 A1 | 11/2002 | Brownell |
| 2003/0018827 A1 | 1/2003 | Guthrie et al. |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0069973 A1 | 4/2003 | Ganesan et al. |

(56) References Cited

U.S. PATENT DOCUMENTS

| | | |
|---|---|---|
| 2003/0097460 A1 | 5/2003 | Higashiyama et al. |
| 2003/0097484 A1 | 5/2003 | Bahl |
| 2003/0103466 A1 | 6/2003 | McCann et al. |
| 2003/0110230 A1 | 6/2003 | Holdsworth et al. |
| 2003/0112755 A1 | 6/2003 | McDysan |
| 2003/0123447 A1 | 7/2003 | Smith |
| 2003/0126029 A1 | 7/2003 | Dastidar et al. |
| 2003/0139183 A1 | 7/2003 | Rantalainen |
| 2003/0154406 A1 | 8/2003 | Honarvar et al. |
| 2003/0169859 A1 | 9/2003 | Strathmeyer et al. |
| 2003/0177267 A1 | 9/2003 | Orava et al. |
| 2003/0179738 A1 | 9/2003 | Diachina et al. |
| 2003/0214948 A1 | 11/2003 | Jin et al. |
| 2003/0217171 A1 | 11/2003 | Von Stuermer et al. |
| 2003/0223413 A1 | 12/2003 | Guerrero |
| 2004/0004975 A1 | 1/2004 | Shin et al. |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0015686 A1 | 1/2004 | Connor et al. |
| 2004/0037322 A1 | 2/2004 | Sukonik et al. |
| 2004/0052257 A1 | 3/2004 | Abdo et al. |
| 2004/0088585 A1 | 5/2004 | Kaler et al. |
| 2004/0095934 A1 | 5/2004 | Cheng et al. |
| 2004/0148425 A1 | 7/2004 | Haumont et al. |
| 2004/0193513 A1 | 9/2004 | Pruss et al. |
| 2004/0218603 A1 | 11/2004 | Lee et al. |
| 2004/0225810 A1 | 11/2004 | Hiratsuka |
| 2004/0240446 A1 | 12/2004 | Compton |
| 2005/0060295 A1 | 3/2005 | Gould et al. |
| 2005/0063303 A1 | 3/2005 | Samuels et al. |
| 2005/0063307 A1 | 3/2005 | Samuels et al. |
| 2005/0074007 A1 | 4/2005 | Samuels et al. |
| 2005/0108420 A1 | 5/2005 | Brown et al. |
| 2005/0114700 A1 | 5/2005 | Barrie et al. |
| 2005/0132060 A1 | 6/2005 | Mo et al. |
| 2005/0135436 A1 | 6/2005 | Nigam et al. |
| 2005/0144278 A1 | 6/2005 | Atamaniouk |
| 2005/0171930 A1 | 8/2005 | Arning et al. |
| 2005/0187979 A1 | 8/2005 | Christensen et al. |
| 2005/0203988 A1 | 9/2005 | Nollet et al. |
| 2005/0216555 A1 | 9/2005 | English et al. |
| 2005/0238010 A1 | 10/2005 | Panigrahy et al. |
| 2005/0238011 A1 | 10/2005 | Panigrahy |
| 2005/0238012 A1 | 10/2005 | Panigrahy et al. |
| 2005/0238022 A1 | 10/2005 | Panigrahy |
| 2005/0265235 A1 | 12/2005 | Accapadi et al. |
| 2005/0271048 A1 | 12/2005 | Casey |
| 2006/0005008 A1 | 1/2006 | Kao |
| 2006/0020598 A1 | 1/2006 | Shoolman et al. |
| 2006/0026290 A1 | 2/2006 | Pulito et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0036747 A1 | 2/2006 | Galvin et al. |
| 2006/0037071 A1 | 2/2006 | Rao et al. |
| 2006/0056443 A1 * | 3/2006 | Tao et al. ............ 370/462 |
| 2006/0123226 A1 | 6/2006 | Kumar et al. |
| 2006/0153228 A1 | 7/2006 | Stahl et al. |
| 2006/0233166 A1 | 10/2006 | Bou-Diab et al. |
| 2006/0235973 A1 | 10/2006 | McBride et al. |
| 2006/0242300 A1 | 10/2006 | Yumoto et al. |
| 2006/0265689 A1 | 11/2006 | Kuznetsov et al. |
| 2006/0294366 A1 | 12/2006 | Nadalin et al. |
| 2007/0094336 A1 | 4/2007 | Pearson |
| 2007/0121615 A1 | 5/2007 | Weill et al. |
| 2007/0153798 A1 | 7/2007 | Krstulich |
| 2007/0156919 A1 | 7/2007 | Potti et al. |
| 2008/0034127 A1 | 2/2008 | Nishio |
| 2008/0253366 A1 | 10/2008 | Zuk et al. |
| 2008/0291910 A1 | 11/2008 | Tadimeti et al. |
| 2009/0063852 A1 | 3/2009 | Messerges et al. |
| 2009/0077618 A1 | 3/2009 | Pearce et al. |
| 2009/0295905 A1 | 12/2009 | Civanlar et al. |
| 2009/0327113 A1 | 12/2009 | Lee et al. |

OTHER PUBLICATIONS

Official Communication for U.S. Appl. No. 11/258,551 mailed Dec. 6, 2012.

Official Communication in U.S. Appl. No. 10/719,375, mailed Feb. 27, 2013.

Enger, R., et al., "FYI on a Network Management Tool Catalog: Tools for Monitoring and Debugging TCP/IP Internets and Interconnected Devices," RFC 1470, Jun. 1993, 52 pages.

F5 Networks Delivers Blistering Application Traffic Management Performance and Unmatched intelligence via New Packet Velocity ASIC and BIG-IP Platforms, F5 Networks, Inc. Press Release dated Oct. 21, 2002, 3 pages.

Freer, A. et al., "The SSL Protocol Version 3.0," IETF, Internet Draft, 62 pages, Nov. 18, 1996.

Hewitt, J. R. et al., "Securities Practice and Electronic Technology," Corporate Securities Series, (New York: Law Journal Seminars-Press) 1998, title page, bibliography page, pp. 4.29-4.30.

Housley, R., et al., "Internet X.509 Public Key Infrastructure Certificate and CRL Profile," RFC 2459, Jan. 1999, 115 pages.

IP Multimedia Subsystem, http://en.wikipedia.org/w/index.php?title=IP_Multimedia_Subsyst..., accessed May 15, 2008, 8 pages.

Oracle Communication and Mobility Server, Aug. 2007, http://www.oracle.com/technology/products/ocms/otn_front.html, accessed May 15, 2008, 108 pages.

Reardon, M., "A Smarter Session Switch: Arrowpoint's CS Session Switches Boast the Brains Needed for E-Commerce," Data Communications, Jan. 1999, title page, pp. 3, 5, 18.

Secure and Optimize Oracle 11i E-Business Suite with F5 Solutions, F5 Application Ready Network Guide, Oracle E-Business Suite 11i, Aug. 2007, 2 pages.

Session Initiation Protocol, http://en.wikipedia.org/w/index.php?title=Session_Initiation_Protoc..., accessed May 14, 2008, 5 pages.

Using the Universal Inspection Engine, Manual Chapter: BIG-IP Solutions Guide v4.6.2: Using the Universal Inspection Engine, 2002, 8 pages.

"BIG-IP Controller With Exclusive OneConnect Content Switching Feature Provides a Breakthrough System for Maximizing Server and Network Performance," F5 Networks, Inc., Press Release, May 8, 2001, accessed Jun. 4, 2002. 3 pages.

"Consistent Hashing," Wikipedia—the free encyclopedia, http://en.wikipedia.org/w/index.php?title=Consistent_hashing&print..., accessed Jul. 25, 2008, 1 page.

"Control Plane," Wikipedia—the free encyclopedia, http://en.wikipedia.org/w/index.php?title=Control_plane&printable=yes, accessed Jul. 31, 2008, 4 pages.

"editcap—Edit and/or translate the format of capture files," ethereal.com, www.ethereal.com/docs/man-pages/editcap.1.html, accessed Apr. 15, 2004, 3 pages.

"ethereal—interactively browse network traffic," ethereal.com, www.ethereal.com/docs/man-pages/ethereal.1.html, accessed Apr. 15, 2004, 29 pages.

"FAQ: Network Intrusion Detection Systems," robertgraharm.com, Mar. 21, 2000, www.robertgraham.com/pubs/network-intrusion-detection.html, accessed Apr. 15, 2004.

"Forwarding Plane," Wikipedia—the free encyclopedia. http://en.wikipedia.org/w/index.php?title=Forwarding_plane&printa..., accessed Jul. 31, 2008.

"Network Management," Wikipedia—the free encyclopedia, http://en.wikipedia.org/w/index.php?title=Network_management&pr..., accessed Jul. 31, 2008, 3 pages.

"Network Sniffer," linuxmigration.com, www.linuxmigration.com/quickref/admin/ethereal.html, accessed Apr. 15, 2004, 4 pages.

"Telecommunications Network," Wikipedia—the free encyclopedia, http://en.wikipedia.org/w/index.php?title=Telecommunications_net..., accessed Jul. 31, 2008, 2 pages.

(56) References Cited

OTHER PUBLICATIONS

"tethereal—Dump and analyze network traffic," ethereal.com, www.ethereal.com/docs/man-pages/tethereal.1.html, accessed Apr. 15, 2004, 11 pages.
Berners-Lee, T. et al., "Uniform Resource identifiers (URI): Generic Syntax," IETF RFC 2396, Aug. 1998.
Bryhni et al., "A Comparison of Load Balancing Techniques for Scalable Web Servers," IEEE Network, Jul./Aug. 2000, pp. 58-64.
Fielding, R. et al., "Hypertext Transfer Protocol—HTTP/1.1" Network Working Group, RFC 2068, Jan. 1997, 152 pages.
Hinden, R. et al., "Format for Literal IPv6 Addresses in URL's," IETF RFC 2732, Dec. 1999.
Hochmuth, P. "F5 CacheFlow Pump Up Content-Delivery Lines," NetworkWorld, May 4, 2001, http://www.network.com/news/2001/0507catchingonline.html, accessed Jun. 1, 2005, 3 pages.
Jacobson, V. et al., "TCP Extensions for High Performance," May 1992, http://www.faqs.org/rfcs/rfc1323.html, pp. 1-37.
Mapp, G., "Transport Protocols—What's Wrong with TCP," Jan. 28, 2004, LCE Lecture at http://www.ice.eng.cam.ac.uk/~gem11,4F5-Lecture4.pdf, pp. 1-60
Nielsen, H. F. et al., "Network Performance Effects of HTTP/1.1, CSS1, and PNG," Jun. 24, 1997, W3 Consortium, http://www.w3.org/TR/NOTE-pipelining-970624$Id:pipeline.html, v 1.48 100/10/18 19:38:45 root Exp $, pp. 1-19.
Postel, J., "Transmission Control Protocol," Sep. 1981, Information Sciences institute, University of Southern California, Marina del Rey, California, http://www.faqs.org/rfc/rfc793.html, pp. 1-21.
Schroeder et al., "Scalable Web ServerClustering Technologies," IEEE Network May/Jun. 2000, pp. 38-45.
Stevens, W. R., "TCP/IP Illustrated," vol. 1: The Protocols, Addison-Wesley Professional. Dec. 31, 1993, pp. 1-17.
Stevens, W., "TCP Slow Start, Congestion Avoidance, Fast Retransmit, and Fast Recovery Algorithms," Jan. 1997, Sunsite.dk, http://rfc.sunsite.dk/rfc/rfc2001.html, pp. 1-6.
Valloppillil, V. et al., "Cache Array Routing Protocol v1.0," Feb. 1998, http://icp.ircache.neticarp.txt, accessed Jul. 25, 2008, 7 pages.
"Data Compression Applications and Innovations Workshop," Proceedings of a Workshop held in conjuction with the IEEE Data Compression Conference, Mar. 31, 1995, 123 pages.
"Direct Access Storage Device Compression and Decompression Data Flow," IBM Technical Disclosure Bulletin, vol. 38, No. 11, Nov. 1995, pp. 291-295.
"Drive Image Professional for DOS, OS/2 and Windows," WSDC Download Guide, http://wsdcds01.watson.ibm.com/WSDC.nsf/Guides/Download/Applications-DriveImage.htm, accessed Nov. 22, 1999, 4 pages.
"Drive Image Professional," WSDC Download Guide, http://wsdcds01.watson.ibrn.com/wsdc.nsf/Guides/Download/Applications-DriveImage.htm, accessed May 3, 2001, 5 pages.
"IBM Announces New Feature for 3480 Subsystem," Tucson Today, vol. 12, No. 337, Jul. 25, 1989, 1 page.
"IBM Technology Products Introduces New Family of High-Performance Data Compression Products," IBM Corporation, Somers, NY, Aug. 16, 1993, 6 pages.
"Magstar and IBM 3590 High Performance Tape Subsystem Technical Guide," IBM, Nov. 1996, 287 pages.
Adaptive Lossless Data Compression—ALDC, IBM, Jun. 15, 1994, 2 pages.
ALDC-Macro—Adaptive Lossless Data Compression, IBM Microelectronics, May 1994, 2 pages.
ALDC1-5S—Adaptive Lossless Data Compression, IBM Microelectronics, May 1994, 2 pages.
ALDC1-20S—Adaptive Lossiess Data Compression, IBM Microelectronics, May 1994, 2 pages.
ALDC1-40S—Adaptive Lossless Data Comptession, IBM Microelectronics, May 1994, 2 pages.
Braden, R., "Requirements for Internet Hosts," RFC 1122, Oct. 1989, 101 pages.
Castineyra, I. et al., "The Nimrod Routing Architecture," RFC 1992, Aug. 1996, 27 pages.

Cheng, J.M. et al., "A Fast, Highly Reliable Data Compression Chip and Algorithm for Storage Systems," IBM, vol. 40, No. 6, Nov. 1996, 11 pages.
Costlow, T., "Sony Designs Faster, Denser Tape Drive," Electronic Engineering Times, May 20, 1996, 2 pages.
Craft, D. J., "A Fast Hardware Data Compression Algorithm and Some Algorithmic Extensions," IBM Journal of Research and Development, vol. 42, No. 6, Nov. 1998, 14 pages.
Craft, D. J., "Data Compression Choice No Easy Call," Computer Technology Review, Jan. 1994, 2 pages.
Degermark, M. et al., "Low-Loss TCP/IP Header Compression for Wireless Networks," J.C. Seltzer AG, Science Publishers, Oct. 1997, pp. 375-387.
Electronic Engineering Times, Issue 759, Aug. 16, 1993, 37 pages.
Electronic Engineering Times, Issue 767, Oct. 11, 1993, 34 pages.
IBM Microelectronics Comdex Fall 1993 Booth Location, 1 page.
Readme, Powerquest Corporation, 1994-2002, 6 pages.
Schneider, K. et al. "PPP for Data Compression in Data Circuit-Terminating Equipment (DCE)," RFC 1976, Aug. 1996m 10 pages.
Simpson, W. "The Point-To-Point Protocol (PPP)," RFC 1661, Jul. 1994, 54 pages.
Zebrose, K. L., "Integrating Hardware Accelerators into Internetworking Switches," Telco Systems, Nov. 1993, 10 pages.
About Computing & Technology, "Wireless/Networking, Nagle algorithm," visited Dec. 6, 2005, 2 pages, http://compnetworking.about.com/od/tcpip/l/bldef_nagle.htm.
Australia's Academic and Research Network, "Programs and large MTU, Nagle algorithm," visited Dec. 9, 2005, 3 pages, http://www.aarnet.edu.au/engineering/networkdesign/mtu/programming.html.
Berners-Lee, T. et al., RFC 1945, "Hypertext Transfer Protocol—TTTP/1.0," May 1996, 60 pages.
Dierks, T. et al., RFC 2246, "The TLS Protocol, Version 1.0," Jan. 1999, 80 pages.
Fielding, R. et al., "Hypertext Transfer Protocol—HTTP/1.1," RFC 2616, W3 Consortium, Jun. 1999, pp. 1-176, http://www.w3.org/Protocols/rfc2616/rfc2616.html.
fifi.org, "Manpage of TCP," visited Dec. 9, 2005, 6 pages, <http://www.fifi.org/cgi-bin/man2html/usr/share/man/man7/tcp.7.gz>.
Freier, A. et al., Netscape Communications Corporation, "The SSL Protocol, Version 3.0," Mar. 1996, 60 pages.
Kessler, G. et al., RFC 1739, "A Primer on Internet and TCP/IP Tools," Dec. 1994, 46 pages.
Nagle, J., RFC 896, "Congestion control in IP/TCP internetworks," Jan. 6, 1984, 13 pages.
OpenSSL, visited Apr. 12, 2006, 1 pg., <www.openssl.org>.
Paxson, V., RFC 2525, "Known TCP Implementation Problems," Mar. 1999, 61 pages.
Rescorla, E. "SSL and TLS, Designing and Building Secure Systems", 2001, Addison-Wesley, 46 pages.
RSA Laboratories, "PKCS #1 v2.0: RSA Cryoptography Standard," Oct. 1, 1998, 35 pages.
SearchNetworking.com, "Nagle's algorithm," visited Dec. 6, 2005, 3 pages http://searchnetworking.techtarget.com/sDefinition/0,,sid7_gci754347,00.html.
Tormasov, A. et al., "TCP/IP options for high-performance data transmission," visited Dec. 9, 2005, 4 pages, http://builder.com.com/5100-6732-1050878.html.
W3C, "HTTP/1.1 and Nagle's Algorithm," visited Dec. 6, 2005, 3 pages, http://www.w3.org/Protocols/HTTP/Performance/Nagle/.
Acharya et al., "Scalable Web Request Routing with MPLS," IBM Research Report, IBM Research Division, Dec. 5, 2001, 15 pages.
Official Communication for U.S. Appl. No. 10/719,375 mailed Jun. 18, 2008.
Official Communication for U.S. Appl. No. 10/719,375 mailed Apr. 24, 2009.
Official Communication for U.S. Appl. No. 10/719,375 mailed Nov. 13, 2009.
Official Communication for U.S. Appl. No. 10/719,375 mailed May 25, 2010.
Official Communication for U.S. Appl. No. 10/719,375 mailed Dec. 7, 2010.
Official Communication for U.S. Appl. No. 10/719,375 mailed Jun. 16, 2011.

(56) References Cited

OTHER PUBLICATIONS

Official Communication for U.S. Appl. No. 10/719,375 mailed Jan. 25, 2012.
Official Communication for U.S. Appl. No. 11/243,844 mailed Oct. 8, 2008.
Official Communication for U.S. Appl. No. 11/243,844 mailed Feb. 20, 2009.
Official Communication for U.S. Appl. No. 11/243,844 mailed Jul. 16, 2009.
Official Communication for U.S. Appl. No. 11/243,844 mailed Feb. 19, 2010.
Official Communication for U.S. Appl. No. 11/243,844 mailed Aug. 3, 2010.
Official Communication for U.S. Appl. No. 11/243,844 mailed Dec. 27, 2010.
Official Communication for U.S. Appl. No. 11/243,844 mailed Jun. 9, 2011.
Official Communication for U.S. Appl. No. 11/243,844 mailed Nov. 8, 2011.
Official Communication for U.S. Appl. No. 11/243,844 mailed Jun. 14, 2012.
Official Communication for U.S. Appl. No. 11/258,551 mailed Mar. 3, 2009.
Official Communication for U.S. Appl. No. 11/258,551 mailed Jan. 4, 2010.
Official Communication for U.S. Appl. No. 11/258,551 mailed Aug. 3, 2010.
Official Communication for U.S. Appl. No. 11/258,551 mailed Mar. 31, 2011.
Official Communication for U.S. Appl. No. 11/258,551 mailed Aug. 15, 2012.
Official Communication for U.S. Appl. No. 11/366,367 mailed Aug. 22, 2008.
Official Communication for U.S. Appl. No. 11/366,367 mailed Feb. 11, 2009.
Official Communication for U.S. Appl. No. 11/366,367 mailed Aug. 4, 2009.
Official Communication for U.S. Appl. No. 11/366,367 mailed Mar. 3, 2010.
Official Communication for U.S. Appl. No. 11/366,367 mailed Jun. 9, 2010.
Official Communication for U.S. Appl. No. 11/366,367 mailed Nov. 9, 2010.
Official Communication for U.S. Appl. No. 11/366,367 mailed Mar. 11, 2011.
Official Communication for U.S. Appl. No. 11/366,367 mailed Jun. 1, 2011.
Official Communication for U.S. Appl. No. 11/366,367 mailed May 18, 2012.
Official Communication for U.S. Appl. No. 12/199,768 mailed Jun. 18, 2010.
Official Communication for U.S. Appl. No. 12/199,768 mailed Nov. 22, 2010.
Official Communication for U.S. Appl. No. 12/199,768 mailed Feb. 1, 2011.
Official Communication for U.S. Appl. No. 12/475,307 mailed Feb. 10, 2011.
Official Communication for U.S. Appl. No. 12/475,307 mailed Jul. 22, 2011.
Official Communicatin for U.S. Appl. No. 12/475,307 mailed Sep. 29, 2011.

* cited by examiner

SELECTIVELY ENABLING PACKET CONCATENATION BASED ON A TRANSACTION BOUNDARY

CROSS-REFERENCE TO RELATED APPLICATIONS

The present application is a continuation of application Ser. No. 11/366,367, filed on Mar. 2, 2006, which claims priority from provisional application Ser. No. 60/764,005 entitled "Selectively Enabling Packet Concatenation Based On Transaction Boundaries," filed on Feb. 1, 2006, the benefit of the earlier filing date of which is hereby claimed at least under 35 U.S.C. §119 (e), and §120, and where each are further incorporated herein by reference.

BACKGROUND OF THE INVENTION

The invention relates generally to communicating content over a network, and more particularly but not exclusively to selectively determining whether to concatenate data into a packet based on a transaction boundary.

Nagle's algorithm concatenates data into a packet to modify a number of packets transmitted over a network. Nagle's algorithm typically concatenates data into a packet until an acknowledgement (ACK) is received or a predetermined amount of data is concatenated in the packet. Subsequently, the packet is transmitted over the network. Nagle's algorithm, named after John Nagle, is described in Request for Comments (RFC) 896 (available at http://www.faqs.org/rfcs/rfc896.html).

Some TCP stacks may also implement a Delayed ACK algorithm. The Delayed ACK algorithm is directed towards minimizing network traffic when many small packets may require many ACK responses. The Delayed ACK algorithm sends an ACK after every two packets have been received, or based on a timing event. In one embodiment, the Delayed ACK algorithm may send an ACK after 200 msec has elapsed, if it has not detected the receipt of a second packet. The Delayed ACK algorithm is described in RFC 1122 (available at http://www.faqs.org/rfcs/rfc1122.html).

While the use of Nagle's algorithm may improve behavior for a network, interactions between Nagle's algorithm and the Delayed ACK algorithm may cause an extra delay in a sending of a packet. Because Nagle's algorithm waits for an ACK before sending a packet, the operation of the Delayed ACK algorithm may cause an undesirable delay in packet transmission. For example, Nagle's algorithm may wait until a delayed ACK is received, before sending the packet, even though the transaction is complete. This delay may be particularly egregious for a transaction based protocol where multiple transactions may be sent in the same session. An example of such a protocol is persistent HTTP 1.1. This situation is documented in http://www.w3.org/Protocols/HTTP/Performance/Nagle.

Therefore, there is a need in the industry to improve how network packets are managed. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
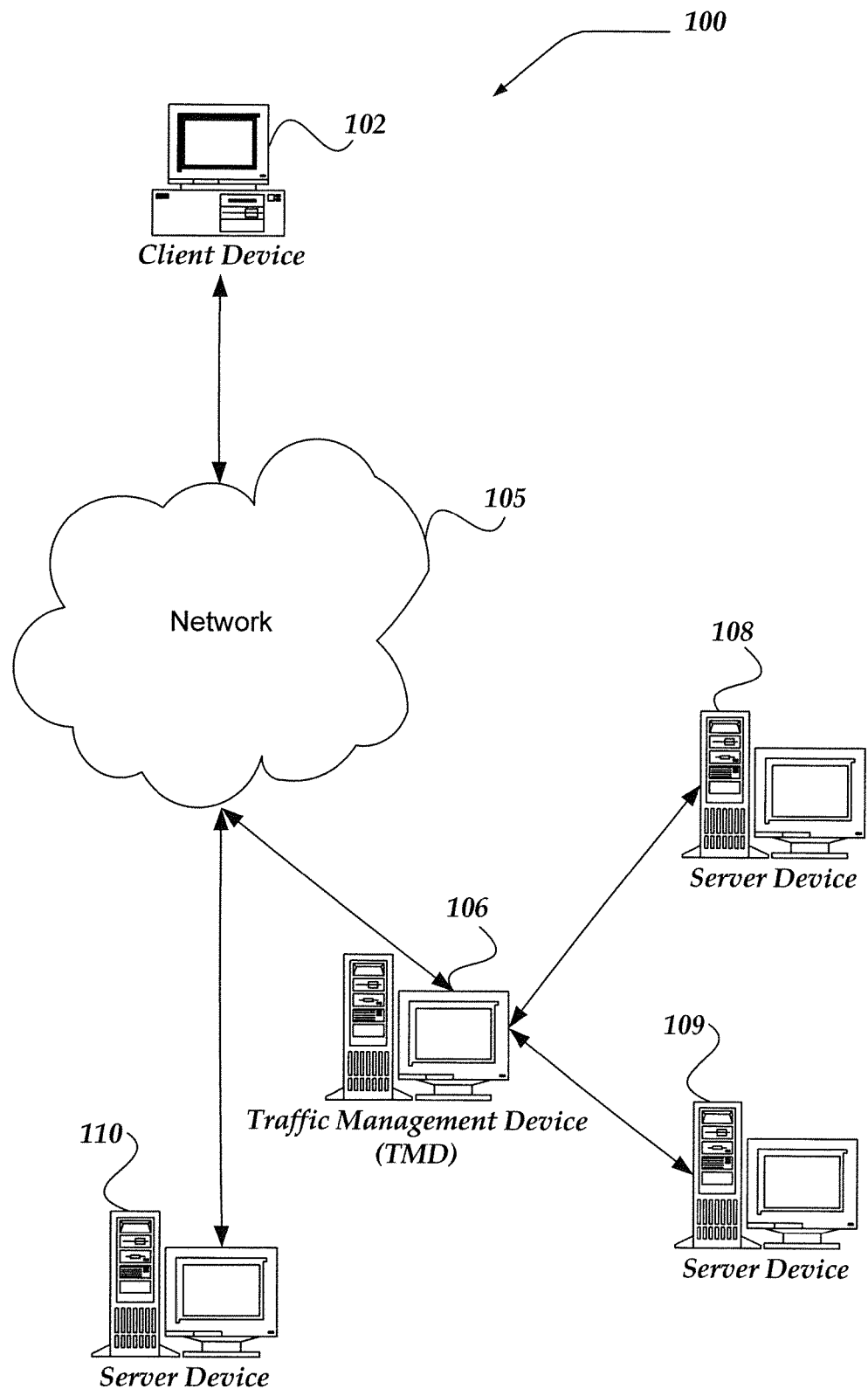
FIG. 1, illustrates one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "transaction" is an application defined logically related grouping of network records at the application layer (OSI Layer 7). For example, a logically related grouping of network records at the application layer may be defined by the HyperText Transfer Protocol (HTTP), HTTP 1.1, TELNET, File Transfer Protocol (FTP), Simple Mail Transfer Protocol (SMTP), or the like. The logically related grouping of network records are embodied by data transmitted at the transport layer (OSI Layer 4) and/or the network layer (OSI Layer 3). For example, the data transmitted at these layers may include Internet Protocol (IP) packets, Transmission Control Protocol (TCP) packets, User Datagram Protocol (UDP), Real-time Transport Protocol (RTP) packets, or the like.

As used herein, a "transaction boundary" is an indication of a transition between one transaction and another transaction. As used herein, a "transaction aware device" (TAD) is any computing device that is arranged to use information associated with syntax and/or semantics of a layer 7 application protocol to detect a transaction.

As used herein, "packets" are the data transmitted at the network layer (OSI Layer 3) and/or the transport layer (OSI Layer 4) and the associated records realized at the application layer (OSI Layer 7).

Briefly stated, the invention is directed towards a system, apparatus, and method for selectively combining data into a packet to modify a number of packets transmitted over a network based on a detection of a transaction boundary. As such, awareness of the higher-level transaction boundaries (e.g. at an application layer (OSI Layer 7)) may be utilized to determine how data may be segmented at lower layers, such as at the transport layer or the network layer, and to provide a more optimal segmentation of data.

In one embodiment, a transaction boundary may be determined by detecting an indicator of an end of a transaction. To detect the end of the transaction, a length of a transaction included in a record and/or protocol header of a packet is received. A plurality of packets is also received. If a length of the plurality of packets equals the length of the transaction, then an indicator of the end of the transaction is provided. In another embodiment, the end of the transaction is based on an end of transaction record, such as an end of file (EOF) indicator within a packet. In one embodiment, an indicator of the end of the transaction may be received from another component, network device, application, or the like. For example, the other component, network device, application or the like may indicate the end of the transaction, a flush of a buffer of data to be sent, or the like, through an application programming interface (API), or the like.

In another embodiment, a transaction boundary may be determined by detecting an indicator of a beginning of a transaction. In one embodiment, the beginning of the transaction may be indicated by a flag within a packet. In one embodiment, an indicator of the beginning of the transaction may be received from another component, network device, application, or the like.

In one embodiment, if it is determined to concatenate the data, such concatenation may continue until an acknowledgement (ACK) is received, or a predetermined amount of data is concatenated in the packet, or a transaction boundary is detected. The ACK may include any record/packet that indicates a response to previously sent information. In one embodiment, if at least one of these conditions is satisfied, the packet may be enabled to be transmitted over the network. In one embodiment, data is concatenated until a timeout event occurs. In one embodiment, Nagle's algorithm, or an algorithm substantially adhering to Nagle's algorithm, may be used for concatenating data into the packet.

Upon detecting the transaction boundary, the invention may inhibit (e.g. disable) concatenation of data into a packet. Disabling concatenation may result in sending the data over the network virtually as soon as the data is available. Sending of the data virtually at once may also result in sending of a short packet. A short packet is a packet that may include less than a predetermined amount of data to be concatenated into the packet.

Concatenation may then be re-enabled. In one embodiment, concatenation may be re-enabled before a subsequent transaction begins. For example, concatenation may be re-enabled upon receipt of an ACK for a previous packet sent, upon detection of another transaction boundary, based on an occurrence of a timeout event, upon receipt of an indication to re-enable concatenation from another component, network device, application, or the like.

In an alternate embodiment, an ACK may be sent virtually immediately based on a write completion indicator included within a packet. Receipt of the ACK may also disable concatenation. In one embodiment, a write completion is indicated based on a variety of events, including when a current write buffer is full, at an end of a write operation, at an end of a transaction, upon closing an application, or the like. A write completion may be indicated by a push flag within a packet.

In one embodiment, the invention determines an amount of time to delay sending an ACK at least partly based on the write completion indicator. In one embodiment, a first packet is received. If a write completion indicator is detected in the first packet, the ACK may be sent virtually immediately. Otherwise, if a second packet is received or a timeout event occurs, the ACK may also be sent. Upon receipt of the ACK, another packet, which may include concatenated data, may be sent over the network.

In one embodiment, the present invention may be implemented on a TAD. The TAD may include a client, a proxy, a server, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 105, traffic management device (TMD) 106, and server devices 108-110. Client device 102 is in communication with TMD 106 and server device 110 through network 105. TMD 106 is in further communication with server devices 108-109. Although not shown, TMD 106 may be in communication with server devices 108-109 through a network infrastructure that is similar to network 105.

Generally, client device 102 may include virtually any computing device capable of connecting to another computing device to send and receive information, including web requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications over network 105.

Client device 102 may communicate with network 105 employing a variety of network interfaces and associated communication protocols. Client device 102 may, for example, use various dial-up mechanisms with a Serial Line IP (SLIP) protocol, Point-to-Point Protocol (PPP), and the like. As such, client device 102 may transfer content at a low transfer rate, with potentially high latencies. For example, client device 102 may transfer data at about 14.4 to about 46 kbps, or potentially more. In another embodiment, client device 102 may employ a higher-speed cable, Digital Subscriber Line (DSL) modem, Integrated Services Digital Network (ISDN) interface, ISDN terminal adapter, or the like. As such, client device 102 may be considered to transfer data using a high bandwidth interface varying from about 32 kbps to over about 622 Mbps, although such rates are highly variable, and may change with technology.

Network 105 is configured to couple client device 102, with other network devices, such as TMD 106, server device 110, or the like. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other fauns of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client device 102 and TMD 106.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

TMD 106 includes virtually any device that manages network traffic. Such devices include, for example, routers, proxies, transparent proxies, firewalls, load balancers, cache devices, application accelerators, devices that perform network address translation, any combination of the preceding devices, or the like. TMD 106 may control, for example, the flow of data packets delivered to or forwarded from an array of server devices, such as server devices 108-109. TMD 106 may direct a request for a resource to a particular server device based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server device so that state information is maintained. TMD 106 also may support a wide variety of network applications such as Web browsing, email, telephony, streaming multimedia and other traffic that is sent in packets. The BIG-IP® family of traffic managers, by F5 Networks of Seattle, Wash., are examples of TMDs. In one embodiment, TMDs 106 may be integrated with one or more of servers 108-109, and provide content or services in addition to the TMD functions described herein.

TMD 106 may receive requests from client device 102. TMD 106 may select a server device from server devices 108-109 to forward the request. TMD 106 may employ any of a variety of criteria and mechanisms to select the server, including those mentioned above, load balancing mechanisms, and the like. TMD 106 may receive a response to the request and forward the response to client device 102.

In one embodiment, server devices may be geographically distributed from each other. In one embodiment, TMD 106 may make a decision as to which server device is best configured to respond to a request from client 102, based on whether the client 102 is connected to the network 105 with a high bandwidth connection. TMD 106 may then either forward a communication to the selected server device or cause the client request to be redirected to the selected server. HTTP redirection may be used to redirect the client request, in one embodiment.

TMD 106 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software.

Servers 108-110 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 108-110 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between server devices 108-110, TMD 106, and client device 102 employing HTTP, HTTPS, and the like.

In one embodiment, server devices 108-110 are configured to operate as a website server. However, server devices 108-110 are not limited to web server devices, and may also operate a messaging server, a File Transfer Protocol (FTP) server, a database server, content server, and the like. Additionally, each of server devices 108-110 may be configured to perform a different operation. Thus, for example, back-end server device 108 may be configured as a messaging server, while back-end server device 109 is configured as a database server. Moreover, while server devices 108-110 may operate as other than a website, they may still be enabled to receive an HTTP communication.

Devices that may operate as server devices 108-110 include personal computers, desktop computers, multiprocessor systems, microprocessor-based or programmable consumer electronics, network PCs, server devices, and the like.

A network device, such as client device 102, TMD 106, or at least one of server devices 108-110 may determine a transaction boundary associated with a network connection. In one embodiment, the network device may be a transaction aware device (TAD). In one embodiment, TMD 106 may determine the transaction boundary by inspecting a flow of data packets delivered to or forwarded from an array of server devices, such as server devices 108-109. For example, TMD 106 may detect a length of a transaction, a flag, an EOF indicator, or the like, included in a packet of the flow of data packets.

In one embodiment, client device 102, TMD 106, and server devices 108-110 may determine the transaction boundary by receiving an indicator of the transaction boundary from another component, network device, application, or the like. For example, an application may indicate the transaction boundary through an application programming interface (API), or the like.

Based, in part, on a determination of the transaction boundary, a network device may selectively enable a concatenation of data into a packet to modify a number of packets transmitted, or to not concatenate the data and rather immediately send data over the network when it is available. In one embodiment, the network device may also receive an indication to re-enable concatenation from another component, another network device, another application, or the like. In another embodiment, a first network device may determine the transaction boundary and may provide the determined information to a second network device. Based, in part, on the received information, the second network device may selectively enable or disable a concatenation.

It is further noted that terms such as client and server device, as used herein, are functions within a device. As such, virtually any device may be configured to operate as a client device, a server device, or even include both a client and a server device function. Furthermore, where two or more peers are employed, any one of them may be designated as a client or as a server, and be configured to confirm to the teachings of the present invention.

Illustrative Network Device

Figure 2:
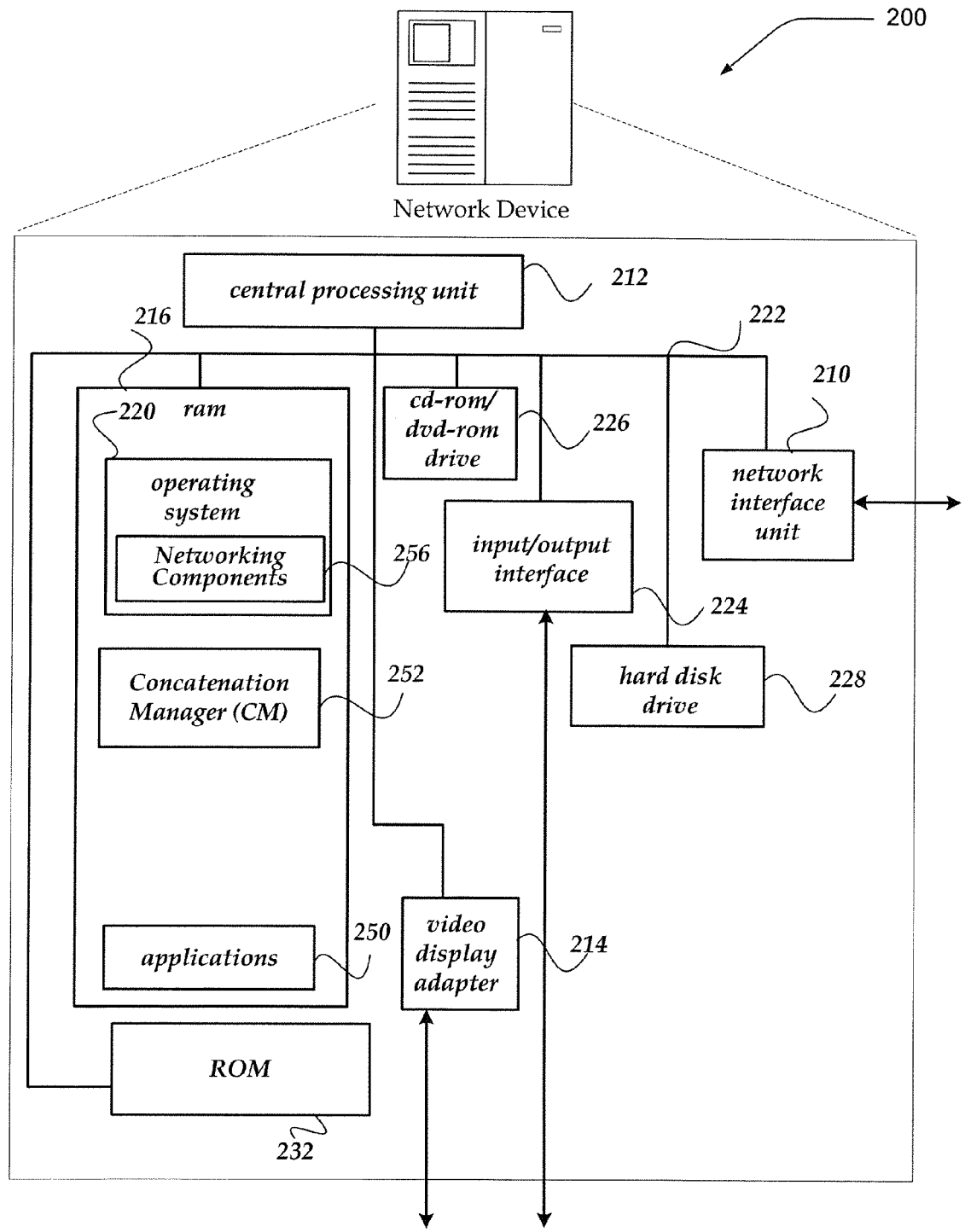
FIG. 2 illustrates one embodiment of a network device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106, server devices 108-110, or even client device 102 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Operating system 220 may further include networking components 256. Network device 200 may also include concatenation manager (CM) 252.

As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, traffic management programs, security programs, and so forth.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like. Similarly, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of CM 252.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Networking components 256 may include, for example, various components to manage operations of an Open Systems Interconnection (OSI) network stack, including Internet Protocol (IP), TCP, UDP, SSL, HTTP, content encoding (e.g., content compression), and similar network related services. Networking components 256 may include a send-queue enabled to buffer messages and/or data before sending the messages over a network. Networking components 256 may utilize a transceiver, such as network interface unit 210, to send the messages over the network. Networking components 256 may be enabled to employ a concatenation of data into a packet to modify a number of packets and/or payload size of the packets transmitted over a network. Networking components 256 may provide a mechanism for enabling the concatenation, or enabling immediately sending data when it is available (e.g., absent of concatenation).

CM 252 may be configured to receive various network information from networking components 256. Based, in part, on the received information from networking components 256, CM 252 may determine an existence of a transaction boundary. The information may be gathered, for example, by networking components 256 based on received packets, sent packets, or the like. In another embodiment, a separate component (not shown) may be configured to determine the transaction boundary and to expose the transaction boundary information to CM 252. In one embodiment, an indicator of the transaction boundary may be received from another component, such as one of applications 250, another network device, or the like. For example, one of applications 250, or the like, may indicate the end of the transaction, a flush of a buffer of data to be sent, or the like, through an application programming interface (API), or the like.

CM 252 may enable the transaction boundary determination to be configurable. For example, CM 252 may provide an interface or the like which enables a user and/or another computing device to provide a set of application level protocols to be inspected. In one embodiment, application level protocols are defined at the application layer (OSI Layer 7). The type of application level protocol may be determined by the data included in a transferred packet and/or the port utilized by the network connection. Examples, of various types of application level protocols include, but are not limited to HTTP, HTTPS, SMTP, FTP, NNTP, or the like.

CM 252 may be enabled to selectively concatenate data into a packet based on the detection of the transaction boundary. CM 252 may selectively concatenate data received from networking components 256, applications 250, or the like. CM 252 may employ a process such as described in conjunction with FIG. 5.

In one embodiment, CM 252 may be enabled to send virtually immediately an ACK based on a write completion indicator included within a packet. CM 252 may detect the write completion indicator based on information received from networking components 256, or the like. CM 252 may employ a process such as described in conjunction with FIG. 6.

Although illustrated in FIG. 2 as distinct components, networking components 256 and CM 252 may be arranged, combined, or the like, in any of a variety of ways, without departing from the scope of the invention. For example networking components 256 and CM 252 may be configured to operate a single component. Moreover, networking components 256 and CM 252 may reside within operating system 220. Furthermore, in one embodiment, networking components 256 and CM 252 may reside on different devices, such as TMD 106 of FIG. 1, server devices 108-110, or client device 102. In one embodiment, CM 252 may be configured to receive various network information from networking components 256 through a network communication, or the like.

Illustrative Signal Flow

Figure 3:
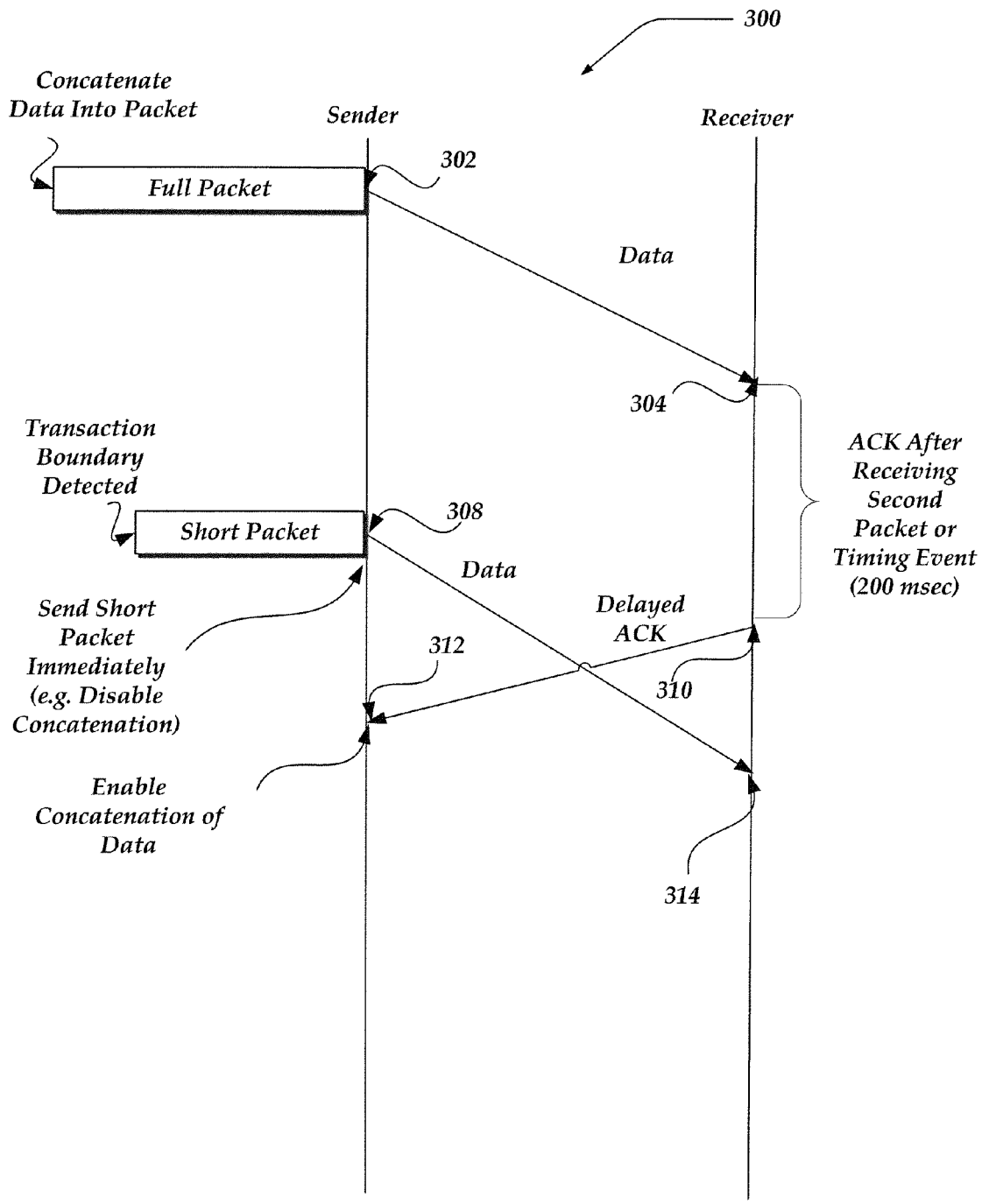
FIG. 3 illustrates one embodiment of a signal flow diagram showing an effect of inhibiting a concatenation of data into a packet.

FIG. 3 illustrates one embodiment of a signal flow diagram showing an effect of inhibiting a concatenation of data into a packet. Signal flow 300 of FIG. 3 may represent a signal flow between client 102 and TMD 106 of FIG. 1. As shown, signal flow 300 illustrates how inhibiting the concatenation may minimize or virtually eliminate a delay caused by the interaction of a concatenation algorithm, such as an algorithm substantially similar to Nagle's algorithm, and a Delayed ACK algorithm.

Signal flow 300 begins at time 302 where data is concatenated into a packet (e.g. full packet) to modify a number of packets transmitted over a network, and the data is sent. For example, data may be concatenated into the packet until a predetermined amount of data is reached (e.g. packet is full). As shown, at time 302, the packet is full, and thus ready for sending. Processing then continues to time 304.

At time 304, the packet is received. In one embodiment, a Delayed ACK algorithm may operate to delay sending an ACK for the received packet until after a second data packet is received or after a timeout event occurs. In one embodiment, the timeout event occurs after about 200 msecs. Processing then continues to time 308.

At time 308, another packet (e.g. short packet) is filled with data and a transaction boundary is detected. Upon detecting the transaction boundary, the invention may inhibit (e.g. disable) concatenation of data into a packet. Disabling concatenation may result in sending the data over the network virtually as soon as the data is available. As shown, sending of the data may also result in sending of a short packet. Processing then continues to time 310.

At time 310, the timeout event occurs and the delayed ACK is sent. In one embodiment, the delayed ACK is sent in accordance with the Delayed ACK algorithm. The delayed ACK may be a particular type of packet, a packet including a particular type of data, protocol, and/or record header, or the like. Processing then continues to time 312.

At time 312, the delayed ACK is received, and concatenation may be re-enabled upon receipt of the ACK. In another embodiment, concatenation may be re-enabled upon detection of another transaction boundary, based on an occurrence of a timeout event, upon receipt of an indication to re-enable concatenation from another component, network device, application, or the like. In another embodiment, concatenation may occur after time 308. Processing then continues to time 314.

At time 314, the short packet is received and processed. For example, the short packet may be utilized to complete a transaction. Processing may continue to another time step for further processing.

Figure 4:
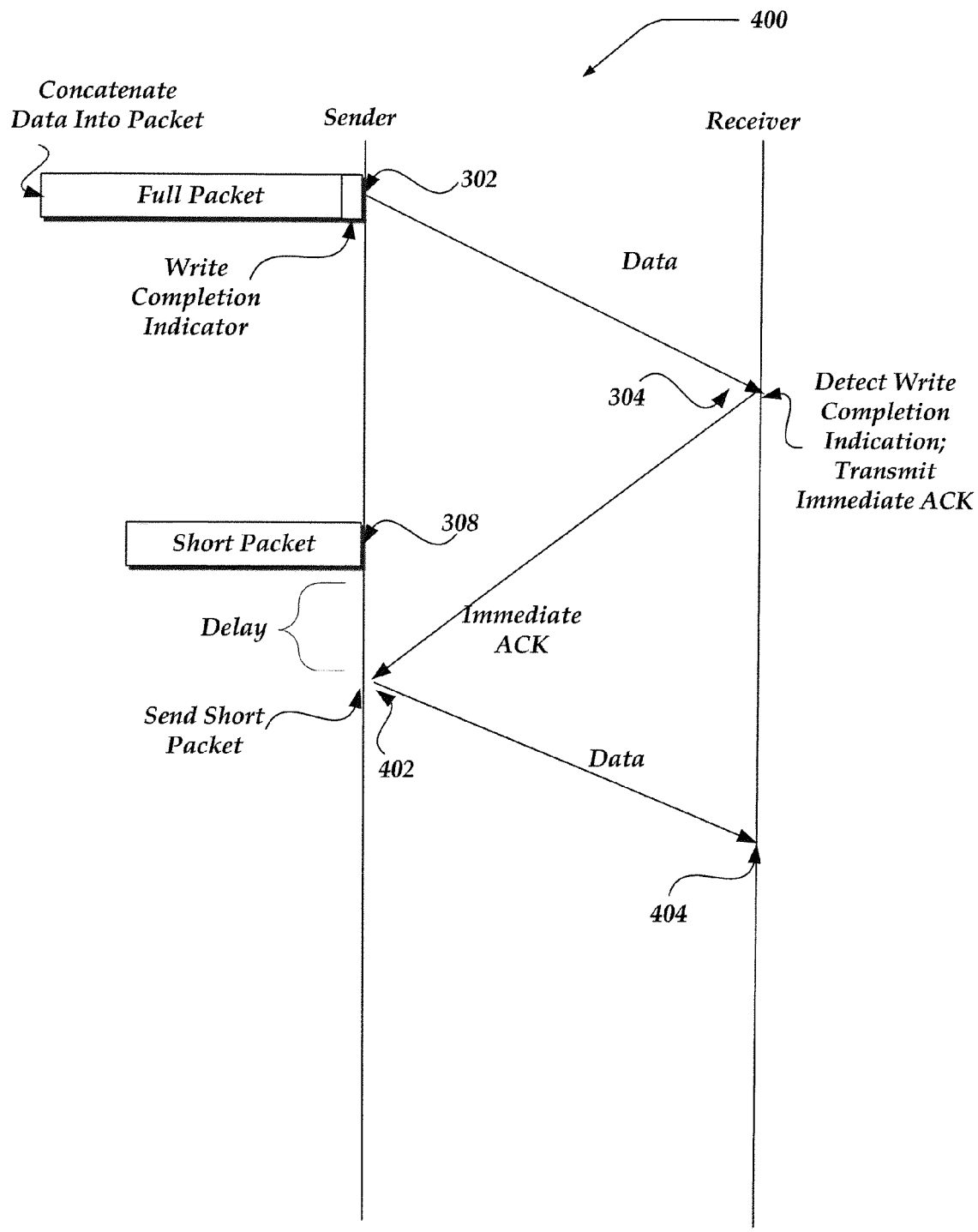
FIG. 4 illustrates one embodiment of a signal flow diagram showing an effect of immediately sending an ACK based on detection of a write completion.

FIG. 4 illustrates one embodiment of a signal flow diagram showing an effect of immediately sending an ACK based on detection of a write completion. Signal flow 400 of FIG. 4 may represent a signal flow between one of servers 108-109 and TMD 106 of FIG. 1. As shown, signal flow 400 illustrates how sending the immediate ACK may minimize a delay caused by the interaction of a concatenation algorithm, such as an algorithm substantially similar to Nagle's algorithm, and a Delayed ACK algorithm.

Signal flow 400 begins at time 302 where data has been concatenated into a packet (e.g. full packet) to modify a number of packets transmitted over a network, and the data is sent. For example, data may be concatenated into the packet until a predetermined amount of data is reached. As shown, the packet is full, and thus ready for sending. Also as shown, the full packet includes a write completion indicator. In one embodiment, the write completion is indicated based on a variety of events, including when a current write buffer is full, at an end of a write operation, at an end of a transaction, upon closing an application, or the like. The write completion may be also indicated by a push flag within the packet. Processing then continues to time 304.

At time 304, the packet is received. In one embodiment, the invention may determine an amount of time to delay sending an ACK at least partly based on the write completion indicator included within the packet received. In one embodiment, if a write completion indicator is not detected, a Delayed ACK algorithm may operate to delay sending an ACK for the received packet until after a second data packet is received or after a timeout event occurs. As shown, the write completion indicator is detected in the packet, and the ACK is sent virtually immediately. Processing then continues to time 308.

At time 308, another packet (e.g. short packet) is filled with data. A concatenation algorithm, substantially similar to Nagle's algorithm may continue concatenation until an acknowledgement (ACK) is received, or a predetermined amount of data is concatenated in the packet. As shown, because the predetermined amount of data has not been sent and an ACK has not been received, the short packet is not sent at time 308. Processing then continues to time 402.

At time 402, the immediately sent ACK is received, thereby enabling the sending of the short packet in accordance with an algorithm substantially similar to Nagle's algorithm. As shown, there may be a delay between time 308 and time 402. However, in one embodiment, this delay may be less then another delay in the absence of an immediately sent ACK (e.g., when a delayed ACK is sent). The short packet is then received for further processing at time 404. Processing may continue to another time step for further processing.

Generalized Operation

Figure 5:
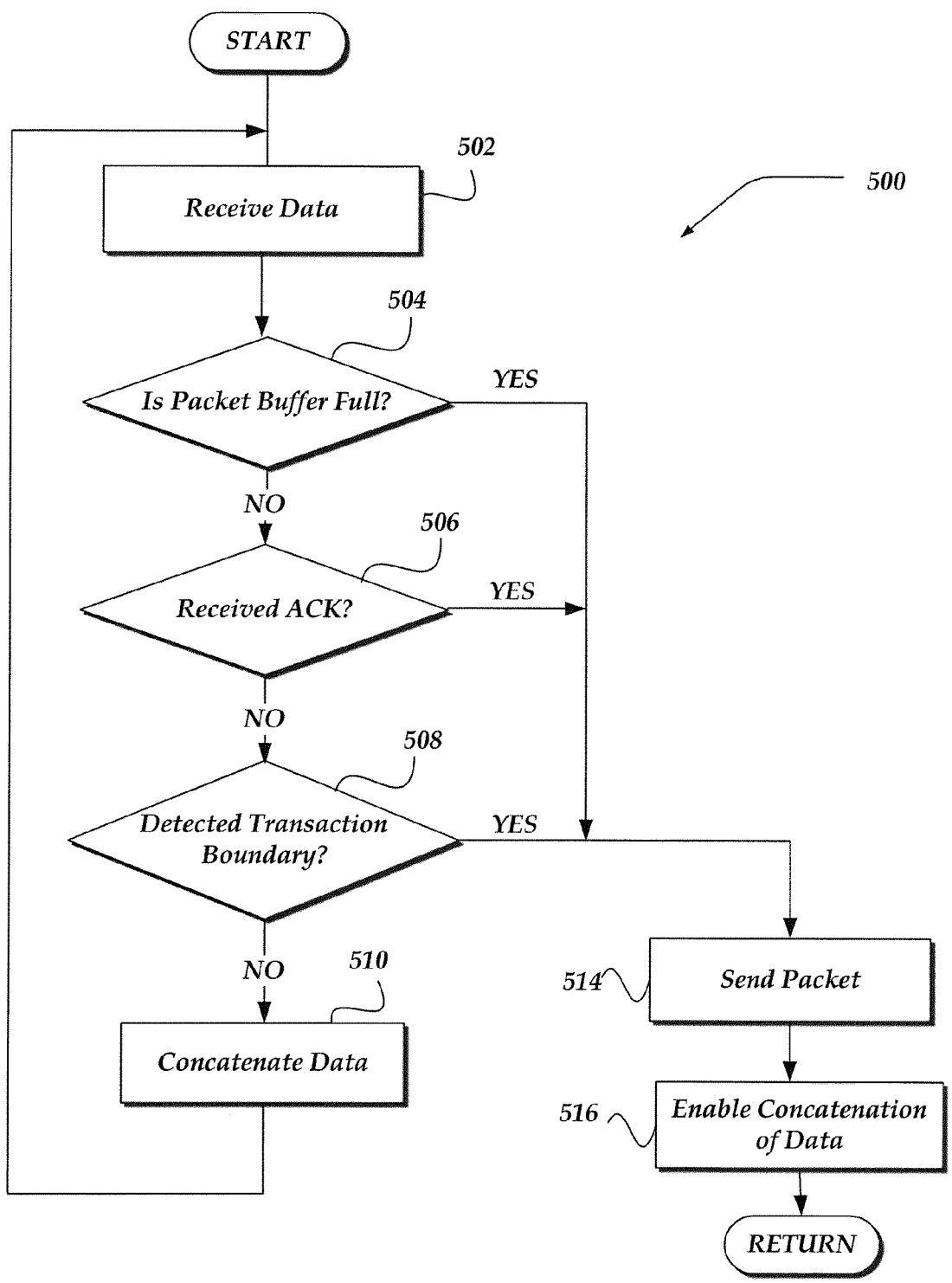
FIG. 5 illustrates a logical flow diagram generally showing one embodiment of a process for selectively enabling network packet concatenation based on a detection of a transaction boundary.

The operation of certain aspects of the invention will now be described with respect to FIGS. 5-6. FIG. 5 illustrates a logical flow diagram generally showing one embodiment of a process for selectively enabling network packet concatenation based on a detection of a transaction boundary. Process 500 of FIG. 5 may be implemented, for example, within CM 252 of FIG. 2.

Process 500 begins, after a start block, at block 502, where a data is received. In one embodiment, the data may be included in a received packet. The packet may be received from a network device, a calling process, a network component, such as networking component 256 of FIG. 2, or the like. A packet's predetermined size (packet buffer) may be as large as an MSS. A packet may include data up to a predetermined amount of data. Processing then continues to decision block 504.

At decision block 504, a determination is made whether a buffer for a packet to be sent is full. In one embodiment, it is determined whether the packet to be sent has accumulated a predetermined amount of data. If the packet to be sent has accumulated the predetermined amount of data then processing continues to block 514. Otherwise, processing continues to decision block 506. In one embodiment (not shown), processing may also continue to block 514 if a timeout event occurs.

At decision block 504, a determination is made whether an ACK has been received. An ACK may be received for a previously sent packet. In one embodiment, the sending of the ACK may have been delayed based on a Delay ACK algorithm. An ACK may be a particular type of packet, a packet including a particular type of data, protocol, and/or record header, or the like. If the ACK has been received, then processing continues to block 514. Otherwise, processing continues to decision block 508.

At decision bock 508, a determination is made whether data should be combined, concatenated, and/or coalesced into a packet based on a detection of a transaction boundary. In one embodiment, the transaction boundary may be determined by detecting an indicator of an end of a transaction. To detect the end of the transaction, a length of a transaction included in a protocol and/or record header of a packet may be received. In one embodiment, the length of the transaction may be included in the data and/or packet received at block 502. After determining the length of the transaction, a plurality of packets is received. For example, the plurality of packets may be associated to the data and/or packet received at block 502. If a length of the plurality of packets equals the length of the transaction, an indicator of the end of the transaction is provided, thereby indicating that the transaction boundary is detected.

In another embodiment, the end of the transaction is based on an end of file (EOF) indicator within a packet. For example, if the EOF indicator is included within the data and/or packet received at block 502, then the transaction boundary is detected. In one embodiment, an indicator of the end of the transaction may be received from another component, network device, application, or the like.

In another embodiment, a transaction boundary may be determined by detecting an indicator of a beginning of a transaction. In one embodiment, the beginning of the transaction may be indicated by a flag within the data and/or packet received at block 502. In one embodiment, an indicator of the beginning of the transaction may be received from another component, network device, application, or the like.

If it is determined that the transaction boundary is detected, then processing continues to block 514. Otherwise, processing continues to block 510.

At block 510, data is concatenated into the packet to be sent. For example, data may be concatenated into the packet until a predetermined amount of data is reached. In one embodiment, a data of a first packet is concatenated with another data. The other data may be provided by a second packet, a networking component, another component, a network API call, or the like. In one embodiment, the concatenated data is stored in the first packet. In another embodiment, data of the first packet is combined and/or coalesced with data of the second packet and stored in the first packet. The combined and/or coalesced result may be further processed by compressing, encrypting, encoding, interleaving the result, or the like. Therefore, concatenation, combination, and/or coalescing of the data further modifies the number of packets and/or a network packet's data payload size sent over the network. In one embodiment, data of a subsequent received packet may be buffered into the packet until the packet buffer is full. Processing then loops back to block 502.

In an alternate embodiment, at block 510, data is instead coalesced into the packet and processing may wait for a predetermined time period. For example, the data may be coalesced until a timeout even occurs, or the like, and then subsequently sent over the network. In one embodiment, the time period may be selectively modified by selectively reducing the time period or selectively extending the time period, or the like. Processing then loops back to block 502.

At block 514, the packet is sent. The sending of the packet may differ depending on whether the buffer is full, an ACK is received, a timeout event occurs, or whether the transaction boundary is detected. For example, if the packet buffer is full, or the transaction boundary is detected, or a timeout event occurs, then the packet may be sent as is, and the received data may be enabled for subsequent processing at block 502. If the packet buffer is not full, then extra data may also be padded into the packet to be sent. Processing then continues to block 514.

At block 514, and in one embodiment, concatenation is enabled. In one embodiment, concatenation may be enabled by enabling an operating system to employ the present invention. In one embodiment, concatenation may be re-enabled before a subsequent transaction begins. For example, concatenation may be re-enabled upon receipt of an ACK for a previous packet sent, upon detection of another transaction boundary, based on an occurrence of a timeout event, upon receipt of an indication to re-enable concatenation from another component, network device, application, or the like. Processing then returns to a calling process for further processing.

In an alternate embodiment, block 510 may occur between block 502 and decision block 504. In this embodiment, data may be concatenated into the packet to be sent as soon as it is available.

Figure 6:
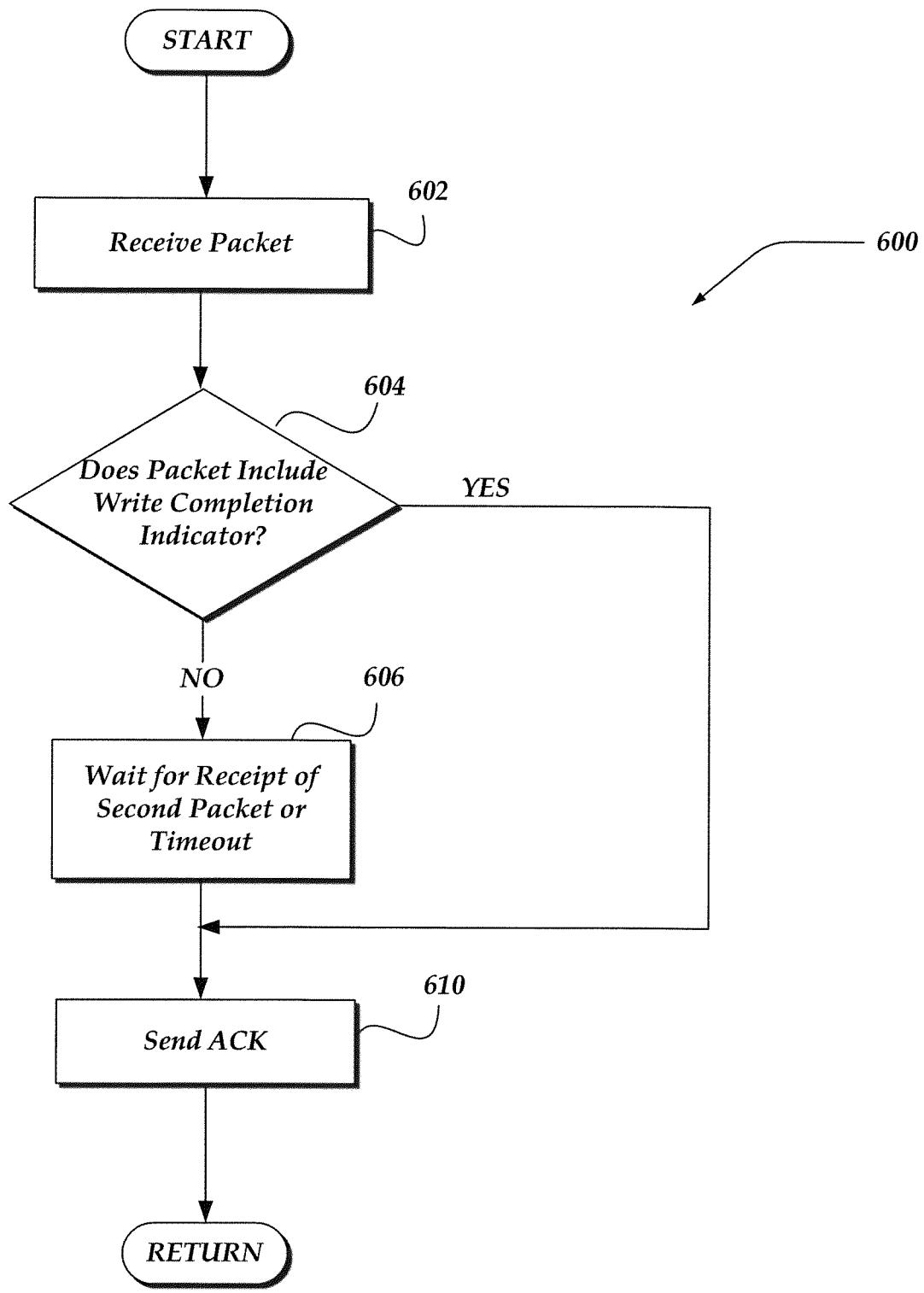
FIG. 6 illustrates a logical flow diagram generally showing one embodiment of a process for immediately sending an ACK based on detection of a write completion indicator, in accordance with the invention.

FIG. 6 illustrates a logical flow diagram generally showing one embodiment of a process for immediately sending an ACK based on detection of a write completion indicator, in accordance with the invention. Process 600 of FIG. 6 may be implemented, for example, within CM 252 of FIG. 2.

Process 600 begins, after a start block, at block 602, where a first packet is received. The first packet may be received from a network device, a calling process, a network component, such as networking component 256 of FIG. 2, or the like. Processing then continues to decision block 604.

At decision block 604, it is determined whether the first packet includes a write completion indicator. In one embodiment, a write completion is indicated based on a variety of events, including when a current write buffer is full, at an end of a write operation, at an end of a transaction, upon closing an application, or the like. In one embodiment, a write completion may be indicated by a push flag within the first packet. In one embodiment, the invention determines an amount of time to delay sending an ACK at least partly based on the write completion indicator. If it is determined that the packet includes a write completion indicator, processing then continues to block 606. Otherwise, processing continues to block 610.

At block 606, processing waits for a receipt of a second packet or for a timeout event to occur. If a second packet is received or a timeout event occurs, processing continues to block 610. At block 610, the ACK may be sent. In one embodiment, the ACK may be sent to the sender of the first and/or second packet.

In one embodiment (not shown), receipt of the ACK may disable concatenation. Receipt of the ACK may also enable another packet, which may include concatenated data, to be sent over the network.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
 a memory device having stored thereon computer-instructions; and
 one or more processors that executes the stored computer-instructions to perform actions, including:
   receiving a first packet of data for transmission over a network;
   monitoring for a concatenation termination (CT) event;
   until a CT event is detected, selectively concatenating data of the first packet with data of a subsequently received second packet, wherein the first packet and the second packet include data for an application layer transaction, and transmitting concatenated packets over the network;
   when the CT event is detected:
     disabling concatenation of packet data, and
     selectively sending a short packet of data over the network, the short packet including less than a predetermined amount of data to be concatenated and being less than a full packet buffer; and
   when a concatenation re-enabling (CR) event is detected, re-enabling concatenation of data from subsequent packets for sending over the network.

2. The network device of claim 1, wherein the CT event comprises one of receiving an acknowledgement (ACK) or detecting an application layer transaction boundary.

3. The network device of claim 1, wherein the CR event comprises receiving a delayed acknowledgement (ACK).

4. The network device of claim 1, wherein the CR event comprises at least one of detecting an occurrence of a timeout event, receiving an acknowledgement (ACK) for a previous packet sent, or receipt of an indication to re-enable concatenation from another network device.

5. The network device of claim 1, wherein the CT event further comprises detecting an application transaction boundary.

6. The network device of claim 1, wherein disabling concatenation further results in sending packet data as soon as the data is available to the network device.

7. The network device of claim 1, wherein monitoring for a concatenation termination (CT) event further comprises monitoring for an end of file indicator within a packet.

8. An apparatus comprising a non-transitory computer readable medium, having computer-executable instructions stored thereon, that in response to execution by a client device, cause the client device to perform operations, comprising:
> monitoring for a concatenation termination (CT) event;
> receiving a first packet of data for transmission over a network;
> until a CT event is detected, selectively concatenating data of the first packet with data of a subsequently received second packet, wherein the first packet and the second packet include data for an application layer transaction, and sending packets of concatenated data over the network;
> when the CT event is detected:
> > disabling concatenation of packet data, and
> > selectively sending a short packet of data over the network, the short packet including less than a predetermined amount of data to be concatenated and being less than a full packet buffer; and
>
> when a concatenation re-enabling (CR) event is detected, re-enabling concatenation of data from subsequent packets for sending over the network.

9. The apparatus of claim 8, wherein sending the short packet further comprises sending data over the network absent concatenation of data with a subsequent packet.

10. The apparatus of claim 8, wherein the CT event comprises one of receiving an acknowledgement (ACK) or detecting an application layer transaction boundary.

11. The apparatus of claim 8, wherein the CR event comprises receiving a delayed acknowledgement (ACK).

12. The apparatus of claim 8, wherein the CR event comprises at least one of detecting an occurrence of a timeout event, receiving an acknowledgement (ACK) for a previous packet sent, or receipt of an indication to re-enable concatenation from another network device.

13. The apparatus of claim 8, wherein the CT event further comprises detecting an application transaction boundary.

14. The apparatus of claim 8, wherein disabling concatenation further results in sending packet data as soon as the data is available to the network device.

15. A system, comprising:
> a sender network device having a processor that performs actions, including:
> > monitoring for a concatenation termination (CT) event;
> > receiving a first packet of data for transmission;
> > until a CT event is detected, selectively concatenating data of the first packet with data of a subsequently received second packet, wherein the first packet and the second packet include data for an application layer transaction, and transmitting packets of concatenated data;
> > when the CT event is detected:
> > > disabling concatenation of packet data, and
> > > selectively transmitting a short packet of data, the short packet including less than a predetermined amount of data to be concatenated and being less than a full packet buffer; and
> >
> > when a concatenation re-enabling (CR) event is detected, re-enabling concatenation of data from subsequent packets for transmission; and
>
> a receiver network device having a processor that performs actions, including:
> > receiving packets having concatenated data;
> > receiving the short packet; and
> > selectively providing a CT or CR event to the sender network device.

16. The system of claim 15, wherein the CT event comprises one of receiving an acknowledgement (ACK) or detecting an application layer transaction boundary.

17. The system of claim 15, wherein the CR event comprises receiving a delayed acknowledgement (ACK).

18. The system of claim 15, wherein the CR event comprises at least one of detecting an occurrence of a timeout event, receiving an acknowledgement (ACK) for a previous packet sent, or receipt of an indication to re-enable concatenation from another network device.

19. The system of claim 15, wherein monitoring for a concatenation termination (CT) event further comprises monitoring for an end of file indicator within a packet.

20. The system of claim 15, wherein monitoring for a CT event further comprises employing application layer syntax of a transaction.

* * * * *